No. 669,193. Patented Mar. 5, 1901.
W. A. ALEXANDER.
DEVICE FOR SUPPLYING WATER TO FLUSH TANKS.
(Application filed June 9, 1900.)
(No Model.)
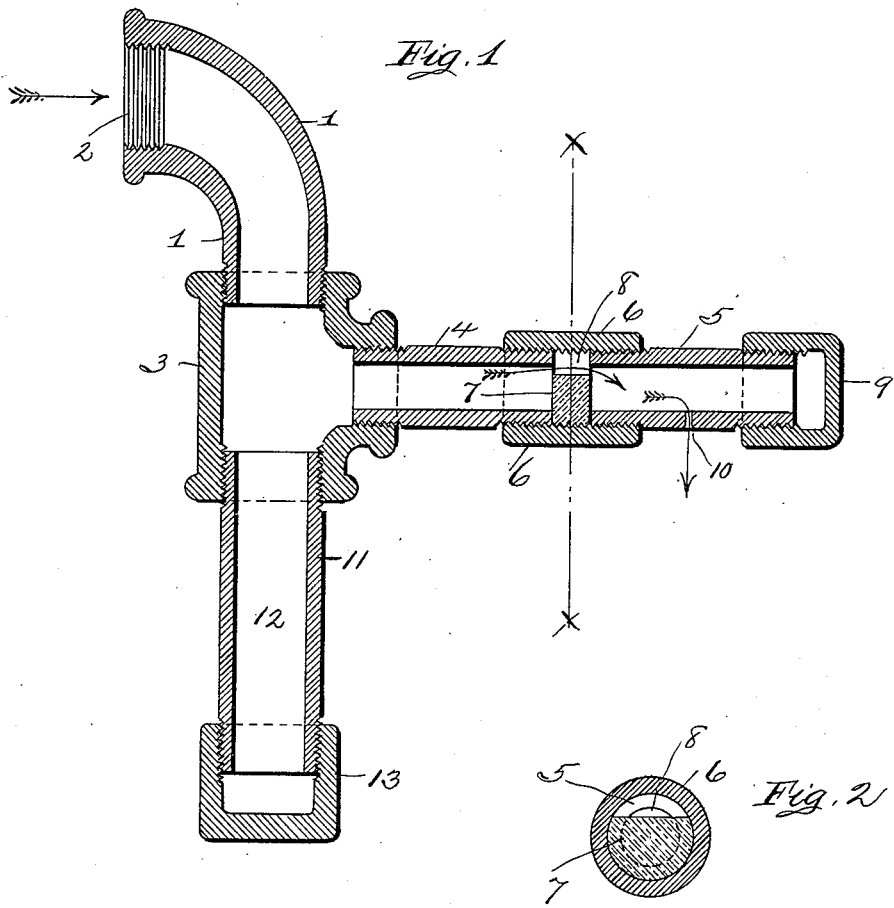

UNITED STATES PATENT OFFICE.

WILLIAM A. ALEXANDER, OF WILKINSBURG, PENNSYLVANIA.

DEVICE FOR SUPPLYING WATER TO FLUSH-TANKS.

SPECIFICATION forming part of Letters Patent No. 669,193, dated March 5, 1901.

Application filed June 9, 1900. Serial No. 19,665. (No model.)

*To all whom it may concern:*

Be it known that I, WILLIAM A. ALEXANDER, a citizen of the United States of America, residing at Wilkinsburg, in the county of Allegheny and State of Pennsylvania, have invented certain new and useful Improvements in Devices for Supplying Water to Flush-Tanks; and I do hereby declare the following to be a full, clear, and exact description thereof, reference being had to the accompanying drawings, which form a part of this specification.

This invention relates to an improved device for supplying water to flush-tanks connected to sewers, closets, &c.; and it consists in the certain details of construction and combination of parts as will be fully described hereinafter.

In the accompanying drawings, Figure 1 is a side sectional elevation of my improved device for supplying water to flush-tanks, which is constructed and arranged in accordance with my invention. Fig. 2 is a sectional end elevation of the same, the said section taken through the line X X of Fig. 1.

To construct a device for supplying water to flush-tanks in accordance with my invention, I provide an elbow 1 of a suitable size and attach the same to a water-supply pipe (not shown) by means of a screw-thread 2. Connected to this elbow 1 is a T connection 3, the lower end of which is fitted with a short section of tubing 11, closed at its extremity by a cap 13. Attached to the T connection 3 by means of a screw-thread is a short pipe 4, which is connected by a coupling 6 to another, 5, of about the same length and diameter, and the two pipes separated by a baffle-plate 7.

This baffle-plate 7 consists of a disk having a segment 8 removed from the top of the same, which will provide communication between the two pipes 4 and 5. The outer extremity of the pipe 5 is closed by a cap 9, and the said pipe provided on its under side with a small perforation 10.

In operation the vertical tube 12 acts as a sediment-chamber and the water slowly escaping from the perforation 10 into the tank will gradually fill the same, and the tank emptied by a siphon in the usual manner for the purpose of flushing sewers, water-closets, &c.

Various slight modifications and changes may be made in the details of construction without departing from the spirit of the invention.

Having thus described my invention, what I claim, and desire to secure by Letters Patent, is—

The herein-described device for supplying water to flush-tanks for sewers, closets, &c., consisting of the sediment-chamber 12 in communication with the water-supply pipe, the horizontal branch pipe 4 5, the baffle-plate 7 arranged in the said branch to check or retard the flow of the water to the outlet, and a perforation 10 arranged in the branch pipe 4 5, beyond the baffle-plate, all arranged and combined for service substantially as and for the purpose described.

In testimony whereof I have hereunto affixed my signature in the presence of two subscribing witnesses.

W. A. ALEXANDER.

Witnesses:
JOHN J. JENNINGS,
JOHN GROETZINGER.